United States Patent
Satake et al.

(10) Patent No.: US 10,053,005 B2
(45) Date of Patent: Aug. 21, 2018

(54) ON-VEHICLE INTERIOR ILLUMINATING DEVICE

(71) Applicant: YAZAKI CORPORATION, Tokyo (JP)

(72) Inventors: Shuji Satake, Shizuoka (JP); Ken Ito, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 97 days.

(21) Appl. No.: 14/566,228

(22) Filed: Dec. 10, 2014

(65) Prior Publication Data

US 2015/0092434 A1 Apr. 2, 2015

Related U.S. Application Data

(63) Continuation of application No. PCT/JP2013/003960, filed on Jun. 25, 2013.

(30) Foreign Application Priority Data

Jun. 27, 2012 (JP) ................. 2012-144761

(51) Int. Cl.
*B60Q 3/64* (2017.01)
*F21V 8/00* (2006.01)
(Continued)

(52) U.S. Cl.
CPC ................ *B60Q 3/64* (2017.02); *B60Q 3/80* (2017.02); *F21S 43/249* (2018.01); *G02B 6/001* (2013.01); *F21Y 2113/13* (2016.08)

(58) Field of Classification Search
CPC ... B60Q 3/80; B60Q 3/66; B60Q 3/64; B60Q 3/62; F21S 43/14; F21S 43/235;
(Continued)

(56) References Cited

U.S. PATENT DOCUMENTS 5,590,945 A * 1/1997 Simms ................ F21S 48/2237
362/23.16
2003/0156422 A1 8/2003 Tatewaki et al.
(Continued)

FOREIGN PATENT DOCUMENTS

DE 10 2010 003 270 A1 9/2011
JP 2001-93305 A 4/2001
(Continued)

OTHER PUBLICATIONS

International Search Report and Written Opinion of the International Search Report for PCT/JP2013/003960 dated Sep. 30, 2013.
(Continued)

*Primary Examiner* — Anh Mai
*Assistant Examiner* — Fatima Farokhrooz
(74) *Attorney, Agent, or Firm* — Kenealy Vaidya LLP

(57) ABSTRACT

An object of the present invention is to provide an on-vehicle interior illuminating device able to show the light moving with a small number of light sources and to reduce cost. The on-vehicle interior illuminating device includes: a light guide member; one light source unit; the other light source unit; and a control unit. The control unit turns on the other light source unit after turning on the one light source unit, turns off the one light source unit after turning on the other light source unit, and turns off the other light source unit after turning off the one light source unit.

12 Claims, 6 Drawing Sheets

(51) Int. Cl.
*B60Q 3/80* (2017.01)
*F21S 43/249* (2018.01)
*F21Y 113/13* (2016.01)

(58) Field of Classification Search
CPC ...... F21S 23/237; F21S 23/249; F21S 43/243; F21S 43/251; F21S 43/26; G02B 6/001; G02B 6/0008; G02B 6/0011; G02B 6/0068; F21Y 2113/13; F21Y 2115/10; F21V 7/0008; F21K 9/00
See application file for complete search history.

(56) References Cited

U.S. PATENT DOCUMENTS

| | | | | |
|---|---|---|---|---|
| 2006/0146530 A1* | 7/2006 | Park | ......... | G02F 1/133603 362/240 |
| 2007/0081360 A1* | 4/2007 | Bailey | ......... | G02B 6/0021 362/621 |
| 2007/0263388 A1* | 11/2007 | Lai | ......... | F21S 8/086 362/287 |
| 2009/0115711 A1* | 5/2009 | Ueyama | ......... | G02B 6/0068 345/87 |
| 2009/0251912 A1 | 10/2009 | Kino et al. | | |
| 2010/0149802 A1* | 6/2010 | Chang | ......... | G02B 6/002 362/235 |
| 2011/0242804 A1* | 10/2011 | Yang | ......... | G02B 6/0068 362/231 |
| 2012/0002435 A1* | 1/2012 | Van Gorkom | ......... | F21V 14/04 362/551 |
| 2013/0002984 A1* | 1/2013 | Uchida | ......... | G02B 6/0055 349/65 |

FOREIGN PATENT DOCUMENTS

| | | |
|---|---|---|
| JP | 2001-251580 A | 9/2001 |
| JP | 2009-9707 A | 1/2009 |
| JP | 2009-164696 A | 7/2009 |
| JP | 2012-17063 A | 1/2012 |
| JP | 2012-96564 A | 5/2012 |

OTHER PUBLICATIONS

Japanese Office Action for the related Japanese Patent Application No. 2012-144761 dated May 10, 2016.
Japanese Office Action for the related Japanese Patent Application No. 2012-144761 dated Nov. 7, 2016.

* cited by examiner

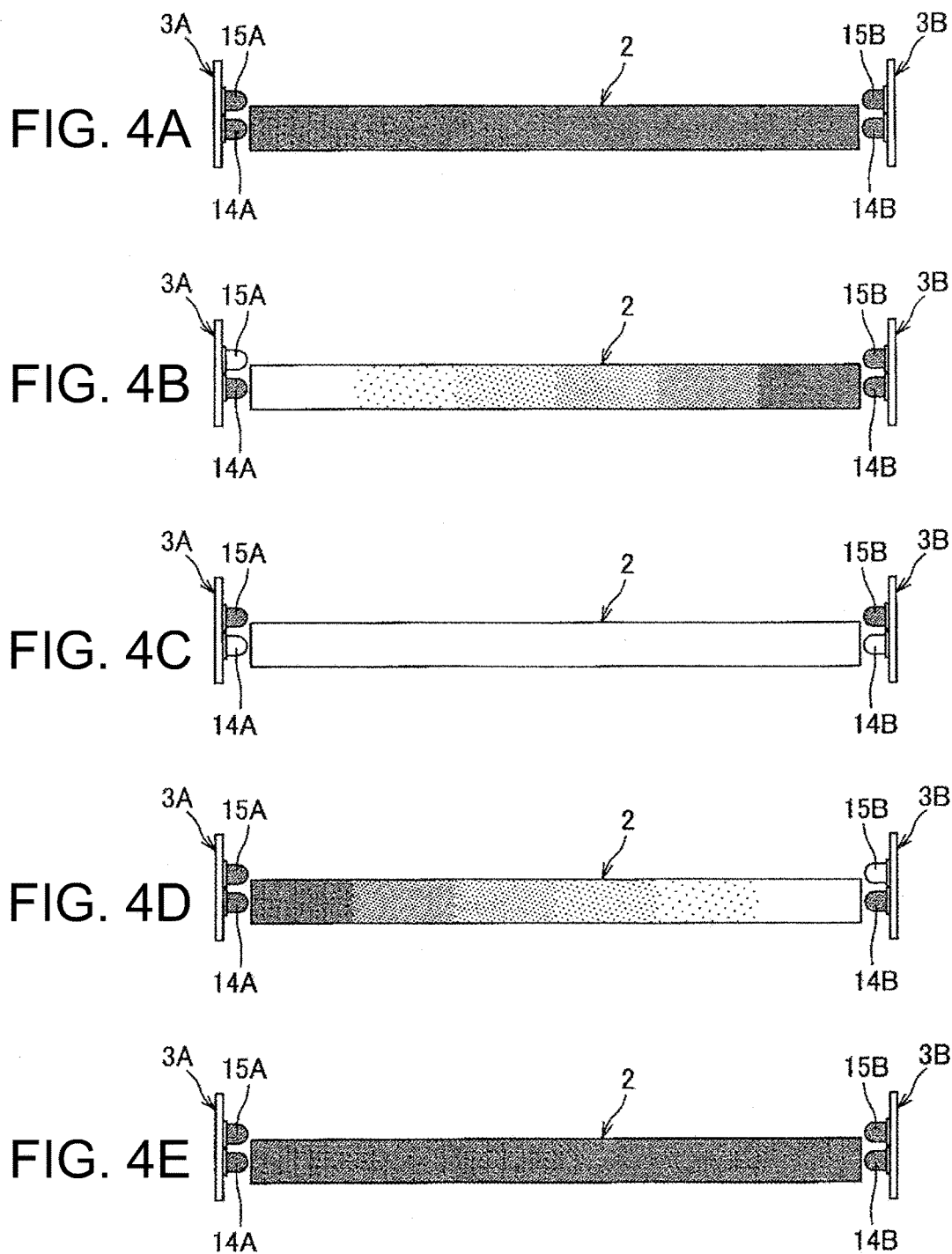

ON-VEHICLE INTERIOR ILLUMINATING DEVICE

TECHNICAL FIELD

The present invention relates to an on-vehicle interior illuminating device for illuminating a cabin of a vehicle or the like.

BACKGROUND ART

As shown in FIG. 6, as an on-vehicle interior illuminating device 101, it is proposed that an illumination effect such that the light flows in one direction is produced by arranging a plurality of light sources 121 to 128 in a cover 120, by lighting sequentially the light sources 121 to 128 in the one direction, and by turning off sequentially the light sources 121 to 128 in the one direction as shown in FIG. 7 (for example, see PTL 1 to PTL 3).

In such an on-vehicle interior lighting device 101, lighting and turning off the light sources 121 to 128 are controlled by a control unit 131 having a control circuit.

CITATION LIST

Patent Literature

[PTL 1]
JP, A, 2012-96564
[PTL 2]
JP, A, 2012-17063
[PTL 3]
JP, A, 2001-93305

SUMMARY OF INVENTION

Technical Problem

However, in the conventional on-vehicle interior illuminating device 101 as shown in PTL 1 to PTL 3, as shown in FIG. 6, in a range producing the illumination effect of the light flowing, it is necessary to arrange a large number of light sources 121 to 128 in a diversifying manner. Therefore, cost of the on-vehicle interior illuminating device 101 is increased due to the large number of the light sources 121 to 128, due to a large number of circuits and wiring for lighting the large number of the light sources 121 to 128, and further by changing the light source to an LED (Light Emitting Diode). Resultingly, there is a problem that the on-vehicle interior illuminating device 101 is expensive.

Further, for attaining an illumination effect of the light flowing smoothly, it is necessary to arrange the LEDs adjacent to each other in the range producing the illumination effect. Therefore, an extraordinarily large number of the LEDs are needed, and there is a problem that the on-vehicle interior illuminating device 101 becomes further expensive.

An object of the present invention is to solve the above problems. Namely, an object of the present invention is to provide an on-vehicle interior illuminating device able to show the light moving with a small number of light sources and to reduce cost.

Solution to Problem

For achieving the above object, according to a first aspect of the present invention, there is provided an on-vehicle interior illuminating device including:

a light guide member having one end and the other end arranged in a longitudinal direction thereof and configured to guide and diffuse light from both the one and the other ends;
one light source unit provided at the one end of the light guide member;
the other light source unit provided at the other end of the light guide member; and
a control unit configured to respectively control lighting of both one and the other light source units,
wherein the control unit turns on the other light source unit after turning on the one light source unit, turns off the one light source unit after turning on the other light source unit, and turns off the other light source unit after turning off the one light source unit.

According to a second aspect of the present invention, there is provided the on-vehicle interior illuminating device as described in the first aspect,
wherein the light emitted from the one light source unit enters obliquely with respect to the one end of the light guide member, and
wherein the light emitted from the other light source unit enters obliquely with respect to the other end of the light guide member.

According to a third aspect of the present invention, there is provided the on-vehicle interior illuminating device as described in the first or second aspect,
wherein the one light source unit is provided with one first light source making the light enter the one end of the light guide member along an optical axis of the light guide member, and one second light source making the light enter obliquely with respect to the one end of the light guide member,
wherein the other light source unit is provided with the other first light source making the light enter the other end of the light guide member along an optical axis of the light guide member, and the other second light source making the light enter obliquely with respect to the other end of the light guide member, and
wherein the control unit turns off the one second light source and turns on the one and the other first light sources after turning on the one second light source, turns off the one and the other first light sources and turns on the other second light source after turning on the one and the other first light sources, and turns off the other second light source after turning on the other second light source.

Advantageous Effects of Invention

According to the invention described in the first aspect, the control unit controls both light source units so that the control unit turns on the other light source unit provided at the other end in the longitudinal direction of the light guide member after turning on the one light source unit provided at one end in the longitudinal direction of the light guide member, turns off the one light source unit after turning on the other light source unit, and turns off the other light source unit after turning off the one light source unit. Therefore, when the other light source unit is turned on after turning on the one light source unit, the whole length in the longitudinal direction of the light guide member is lighted after the one end side in the longitudinal direction of the light guide member is lighted. Then, when the one light source unit is turned off after turning on the other light source unit, the other end side in the longitudinal direction of the light guide member is lighted after the whole length in the longitudinal direction of the light guide member is lighted. Then, when the other light source unit is turned off after the one light source is turned off, the whole length in the longitudinal direction of the light guide member is extinguished after the other end side in the longitudinal direction of the light guide member is lighted.

In this way, when the one and the other light source units are controlled by the control unit so that the one end side of the light guide member is lighted, then the whole length of the light guide member is lighted, then the other end side of the light guide member is lighted, and then the whole length of the light guide member is distinguished, a bright portion in the light guide member is moved and it appears as though the light is moved from the one end to the other end in the longitudinal direction of the light guide member.

Further, when the light emitted from the one light source unit entering the one end in the longitudinal direction of the light guide member is guided and diffused, light gradation is formed such that light quantity is gradually reduced toward the other end in the longitudinal direction of the light guide member. Further, when the light emitted from the other light source unit entering the other end in the longitudinal direction of the light guide member is guided and diffused, light gradation is formed such that light quantity is gradually reduced toward the one end in the longitudinal direction of the light guide member. Thereby, it appears as though the light flows smoothly.

In this way, it appears as though the light flows smoothly with a small number of the light source units. Thereby, the circuit and the wiring for lighting the light source units are simplified and at low cost. Therefore, even using an LED in the light source unit, the cost can be reduced, and the cost of the on-vehicle interior lighting device can be reduced.

According to the invention described in the second aspect, because the light emitted from the one light source unit enters obliquely with respect to the one end in the longitudinal direction of the light guide member, emphatic light gradation is formed such that the one end side becomes brighter and the other end side in the longitudinal direction of the light guide member becomes darker. Further, because the light emitted from the other light source unit enters obliquely with respect to the other end in the longitudinal direction of the light guide member, emphatic light gradation is formed such that the other end side becomes brighter and the one end side in the longitudinal direction of the light guide member becomes darker. Thereby, it more clearly appears as though the light flows smoothly.

According to the invention described in the third aspect, because the control unit turns off the one second light source and turns on the one and the other first light sources after turning on the one second light source, the whole length in the longitudinal direction of the light guide member becomes further brighter after the one end side in the longitudinal direction of the light guide member becomes further brighter. Further, because the control unit turns off the one and the other first light sources and turns on the other second light source after turning on the one and the other first light sources, the other end side in the longitudinal direction of the light guide member becomes further brighter after the whole length in the longitudinal direction of the light guide member becomes further brighter. Further, because the control unit turns off the other second light source after turning on the other second light source, the whole length in the longitudinal direction of the light guide member becomes dark after the other end side in the longitudinal direction of the light guide member becomes further brighter.

In this way, because the one end side becomes further brighter, the whole length becomes further brighter, and the other end becomes further brighter, it further clearly appears as though the light is moved from the one end to the other end in the longitudinal direction of the light guide member.

BRIEF DESCRIPTION OF DRAWINGS

FIG. 4A is an explanatory view for explaining an illumination effect of the illuminating device shown in FIG. 1 showing a whole length of a light guide member is distinguished in an initial condition.

FIG. 4B is an explanatory view showing the one end side of the light guide member is lighted.

FIG. 4C is an explanatory view showing the whole length of the light guide member is lighted.

FIG. 4D is an explanatory view showing the other end side of the light guide member is lighted.

FIG. 4E is an explanatory view showing the whole length of the light guide member is distinguished.

DESCRIPTION OF EMBODIMENTS

Hereinafter, an embodiment of the present invention will be explained with reference to attached figures. Incidentally, the following embodiment of the present invention is only a typical embodiment of the present invention, and the present invention is not limited to this embodiment. Accordingly, various modifications and alterations of the present invention may be made by those skilled in the art without departing from the scope and spirit of this invention.

Figure 1A:
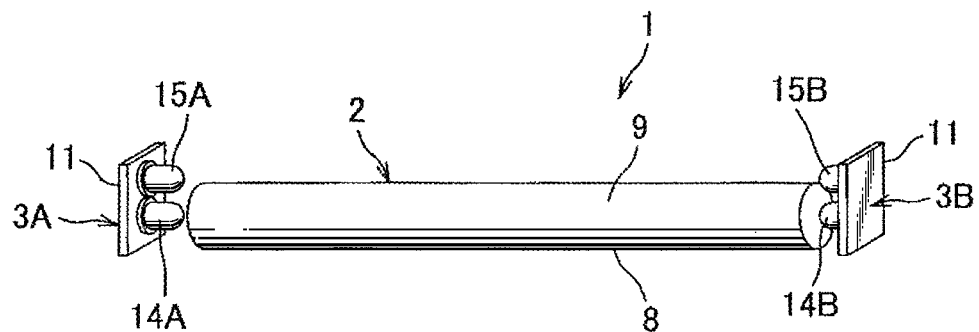
FIG. 1A is a perspective view showing a configuration of an illuminating device according to a first embodiment of the present invention.
Figure 1B:
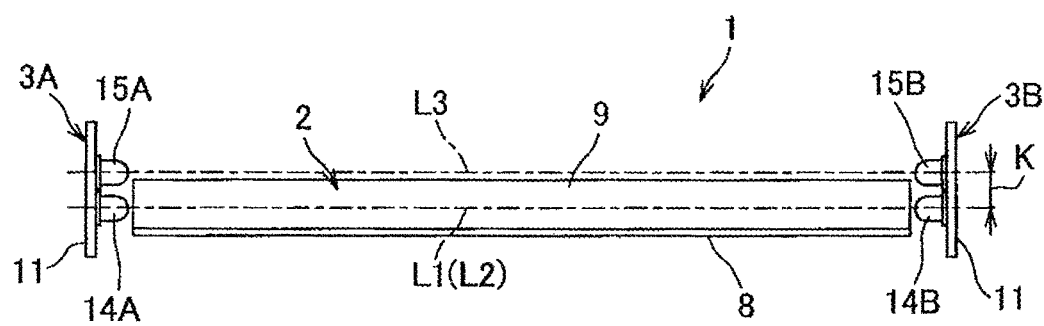
FIG. 1B is a side view showing the configuration of the illuminating device according to the first embodiment of the present invention.
Figure 1C:
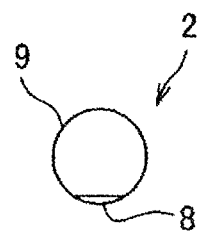
FIG. 1C is a side view showing an end of a light guide member.
Figure 2:
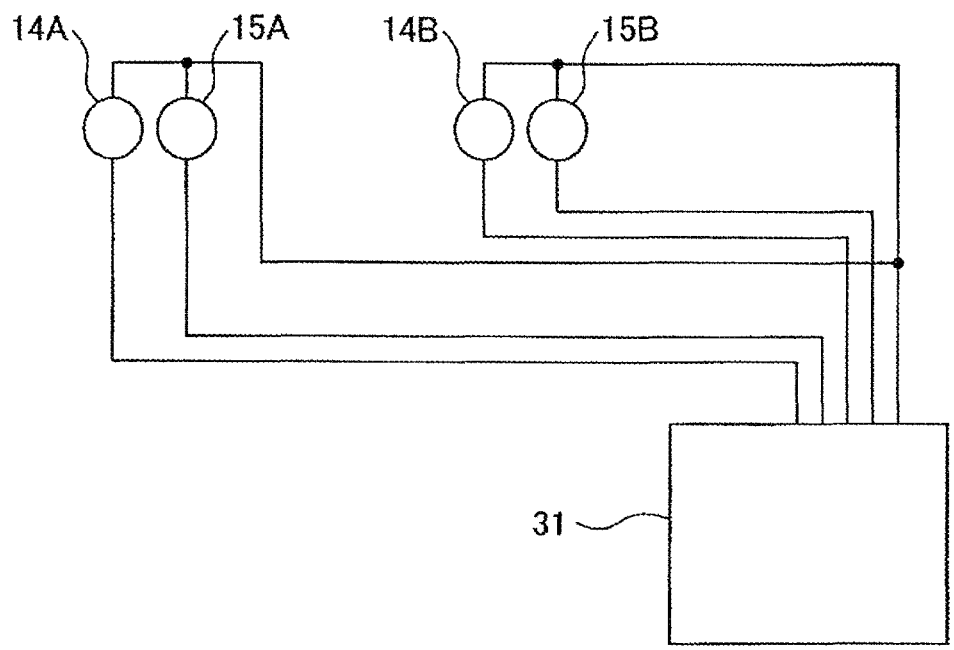
FIG. 2 is a schematic block diagram showing an electric circuit of the illuminating device shown in FIG. 1.

FIGS. 1A to 1C are an explanatory view for explaining a configuration of an on-vehicle interior illuminating device 1 (hereinafter referred to as the "illuminating device") according to a first embodiment of the present invention. FIG. 2 shows a schematic block diagram of an electric circuit of the illuminating device 1.

The illuminating device 1 according to the first embodiment of the present invention can be used as a lamp provided in an interior of a vehicle such as a room lamp provided on a roof trim of a vehicle or the like for illuminating a whole of the interior, a scuff lamp provided on a foot side of a door opening for illuminating upward when opening or closing the door, a foot lamp provided on a bottom of an instrument panel for illuminating a foot of a front seat crew, or a door pocket lamp provided in a door pocket of a door trim for illuminating upward from the door pocket.

As shown in FIG. 1A, the illuminating device 1 includes: a light guide member 2; one light source unit 3A provided at one end in a longitudinal direction of the light guide member 2; and the other light source unit 3B provided at the other end in the longitudinal direction of the light guide member 2.

As shown in FIGS. 1A and 1C, the light guide member 2 is formed in a cylinder shape of which a cross-section perpendicular to an axis is a circular shape. Further, as shown in FIGS. 1B and 1C, the light guide member 2 includes: a light guide portion 9 in which the light entering from both ends of in the longitudinal direction is guided and diffused, and a reflecting portion 8 for reflecting the guided and diffused light in the light guide portion 9.

Incidentally, a light guide plate formed in a square pole shape can be used as the light guide member 2 instead of the light guide tube formed in a cylinder shape. Further, a reflecting plate formed in an arc shape along an outer periphery of the light guide portion 9 formed in a cylinder shape can also be used.

Both ends in the longitudinal direction of the light guide portion 9 are an entrance plane through which the light from later-described one light source unit 3A or the other light source unit 3B enters.

Further, the light guide portion 9 is made of high transparent material such as polymethylmethacrylate resin (PMMA resin), polycarbonate resin (PC resin), cyclic polyolefin resin (COP resin), acrylic resin, or glass, and of material allowing the incident light to repeat total reflection at a critical angle for an air to the material interface.

The reflecting portion 8 is made of synthetic resin such as polyethylene terephthalate resin (PET resin), PC resin, or polypropylene resin.

Further, the reflecting portion 8 is adhered to the light guide portion 9 with a plurality of reflecting dots made of adhesive for reflecting the light repeating the total reflection in the light guide portion 9 (adhesive dot system). In this way, the reflective dots are held between the reflecting portion 8 and the light guide portion 9.

A shape and a size (area) of each reflecting dot are set so that when the light enters the light guide portion 9 from both ends in the longitudinal direction of the light guide portion 9 simultaneously, the brightness of the light is even throughout the whole length of the light guide portion 9.

The light repeating the total reflection in the light guide portion 9 can be reflected by so-called silk print system such that the reflection dots are printed on an outer peripheral wall of the light guide portion 9 with white ink, by so-called molding system such that concaves and convexes are formed on the outer peripheral wall of the light guide portion 9, by so-called groove processing system such that grooves are formed on the outer peripheral wall of the light guide portion 9 or the like.

As shown in FIGS. 1A and 1B, the one light source unit 3A includes: one first LED 14A as one first light source; one second LED 15A as one second light source; and a printed circuit board 11 on which the one first LED 14A and the one second LED 15A are surface-mounted.

The one first LED 14A is composed of a light emitting diode (LED). As shown in FIG. 1B, the one first LED 14A is surface-mounted on the printed circuit board 11. As shown in FIG. 2, the lighting and the extinction of the one first LED 14A is controlled by a control unit 31 having a control circuit.

Further, as shown in FIG. 1B, the one first LED 14A is arranged so that an optical axis L1 of the one first LED 14A is consistent with a designed optical axis L2 of the light guide portion 9. Namely, the one first LED 14A is arranged so that the light from the one first LED 14A enters along the optical axis L2 of the light guide member 2 from one end in the longitudinal direction of the light guide member 2.

Incidentally, in the present invention, the phrase "the one first LED 14A is arranged so that an optical axis L1 of the one first LED 14A is consistent with a designed optical axis L2 of the light guide portion 9" means that an incident position of the light emitted from the one first LED 14A to the one end in the longitudinal direction of the light guide portion 9 is arranged on a designed position where the light is equally guided and diffused throughout the light guide portion 9.

The one second LED 15A is composed of a light emitting diode (LED). As shown in FIG. 1B, the one second LED 15A is surface-mounted on the printed circuit board 11. As shown in FIG. 2, the lighting and the extinction of the one second LED 15A is controlled by the control unit 31.

Further, as shown in FIG. 1B, the one second LED 15A is arranged so that an optical axis L3 of the one second LED 15A is inclined with respect to the designed optical axis L2 of the light guide portion 9. Namely, the one second LED 15A is arranged so that the light from the one second LED 15A enters obliquely the light guide member 2 from one end in the longitudinal direction of the light guide member 2. An incident angle of the one second LED 15A is different from the one first LED 14A.

Incidentally, in the present invention, the phrase "the one second LED 15A is arranged so that an optical axis L3 of the one second LED 15A is inclined with respect to the designed optical axis L2 of the light guide portion 9" means that an incident position of the light emitted from the one second LED 15A to the one end in the longitudinal direction of the light guide portion 9 is arranged so as to be sifted from the designed optical axis L2, and means that the one second LED 15A is arranged so that the light gradation is formed such that the one end side in the longitudinal direction of the light guide portion 9 is brighter and the other end side in the longitudinal direction of the light guide portion 9 is darker.

As shown in FIGS. 1A and 1B, the other light source unit 3B includes: the other first LED 14B as the other first light source; the other second LED 15B as the other second light source; and a printed circuit board 11 on which the other first LED 14B and the other second LED 15B are surface-mounted.

The other first LED 14B is composed of a light emitting diode (LED). As shown in FIG. 1B, the other first LED 14B is surface-mounted on the printed circuit board 11. As shown in FIG. 2, the lighting and the extinction of the other first LED 14B is controlled by the control unit 31.

Further, as shown in FIG. 1B, the other first LED 14B is arranged so that an optical axis L1 of the other first LED 14B is consistent with the designed optical axis L2 of the light guide portion 9. Namely, the other first LED 14B is arranged so that the light from the other first LED 14B enters along the optical axis L2 of the light guide member 2 from the other end in the longitudinal direction of the light guide member 2.

Incidentally, in the present invention, the phrase "the other first LED 14B is arranged so that an optical axis L1 of the other first LED 14B is consistent with the designed optical axis L2 of the light guide portion 9" means that an incident position of the light emitted from the other first LED 14B to the other end in the longitudinal direction of the light guide portion 9 is arranged on a designed position where the light is equally guided and diffused throughout the light guide portion 9.

The other second LED 15B is composed of a light emitting diode (LED). As shown in FIG. 1B, the other second LED 15B is surface-mounted on the printed circuit board 11. As shown in FIG. 2, the lighting and the extinction of the other second LED 15 is controlled by the control unit 31.

Further, as shown in FIG. 1B, the other second LED 15B is arranged so that an optical axis L3 of the other second LED 15B is inclined with respect to the designed optical axis L2 of the light guide portion 9. Namely, the other second LED 15B is arranged so that the light from the other second LED 15B enters obliquely the light guide member 2 from the other end in the longitudinal direction of the light guide member 2. An incident angle of the other second LED 15B is different from the other first LED 14B.

Incidentally, in the present invention, the phrase "the other second LED 15B is arranged so that an optical axis L3 of the other second LED 15B is inclined with respect to the designed optical axis L2 of the light guide portion 9" means that an incident position of the light emitted from the other second LED 15B to the other end in the longitudinal direction of the light guide portion 9 is arranged so as to be sifted from the designed optical axis L2, and means that the other second LED 15A is arranged so that the light gradation is formed such that the other end side in the longitudinal direction of the light guide portion 9 is brighter and the one end side in the longitudinal direction of the light guide portion 9 is darker.

The control unit 31 controls operations of various electrical components of a vehicle or the like, and for example, an ECU (Electronic Control Unit) including: a microprocessor; an I/O; a communication module; and the like is used as the control unit 31. Further, the control unit 31 is configured so as to control the illuminating device 1 based on a door sensor signal detecting the opening and the closing of a vehicle door, or on an operation of a crew.

Figure 3:
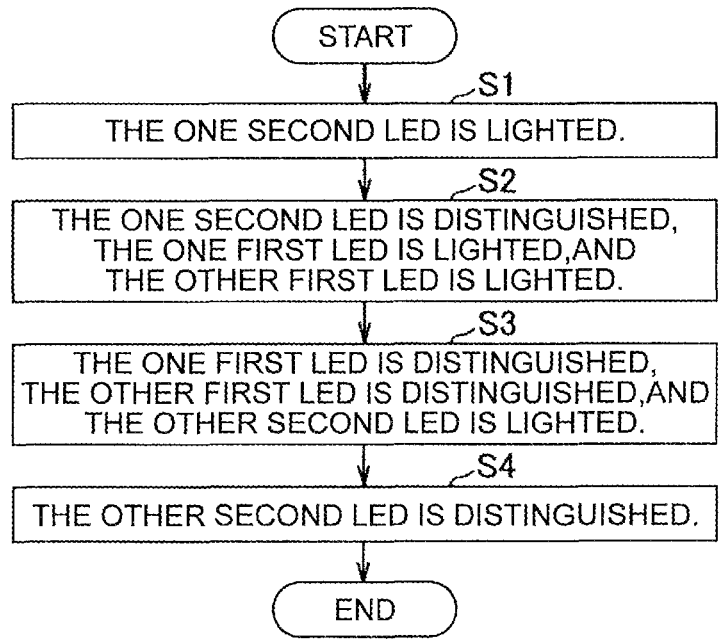
FIG. 3 is a flowchart showing a control procedure performed by a control unit.

Next, an illumination effect in the illuminating device 1 according to the first embodiment of the present invention will be explained with reference to FIGS. 3 to 4E. FIG. 3 is a flowchart of control procedure. FIGS. 4A to 4E schematically show the illumination effect.

As shown in FIG. 4A, in an initial condition, the one first LED 14A and the one second LED 15A of the one light source unit 3A are distinguished, the other first LED 14B and the other second LED 15B of the other light source unit 3B are distinguished, and the whole length of the light guide member 2 is distinguished.

Next, as shown in FIGS. 3 and 4B, the one second LED 15A of the one light source unit 3A is lighted, and the one end side in the longitudinal direction of the light guide member 2 is lighted (step S1).

At this time, as shown in FIG. 4B, light gradation is formed such that the one end side in the longitudinal direction of the light guide member 2 becomes bright, and the other end side in the longitudinal direction of the light guide member 2 becomes dark. Incidentally, in figures, because the light gradation is schematically shown by small dot patterns, the gradation is shown in six grades. However, in reality, the gradation is smoothly changed.

Next, as shown in FIGS. 3 and 4C, the one second LED 15A of the one light source unit 3A is distinguished, and the one first LED 14A of the one light source unit 3A is lighted. Further, the other first LED 14B of the other light source unit 3B is lighted. Thereby, the whole length of the light guide member 2 is lighted (step S2).

Next, as shown in FIGS. 3 and 4D, the one first LED 14A of the one light source unit 3A is distinguished, and the other first LED 14B of the other light source unit 3B is distinguished. Further, the other second LED 15B of the other light source unit 3B is lighted. Thereby, the other end side in the longitudinal direction of the light guide member 2 is lighted (step S3).

At this time, as shown in FIG. 4D, light gradation is formed such that the other end side in the longitudinal direction of the light guide member 2 becomes bright, and the one end side in the longitudinal direction of the light guide member 2 becomes dark. Incidentally, in figures, because the light gradation is schematically shown by small dot patterns, the gradation is shown in six grades. However, in reality, the gradation is smoothly changed.

Next, as shown in FIGS. 3 and 4E, the other second LED 15B of the other light source unit 3B is distinguished, and the whole length of the light guide member 2 is distinguished (step 4).

In this way, the procedure of step S1 to S4 is sequentially performed, and the illumination effect such that the light flows from the one end to the other end in the longitudinal direction of the light guide member 2 is attained.

As explained the above, the illuminating device 1 according to the first embodiment of the present invention includes: the light guide member 2, the light entering from both ends of which in a longitudinal direction thereof being guided and diffused; the one light source unit 3A provided at one end in the longitudinal direction of the light guide member 2; the other light source unit 3B provided at the other end in the longitudinal direction of the light guide member 2; and the control unit 31 respectively controls lighting of both one and the other light source units 3A, 3B. The one light source unit 3A is provided with one first light source 14A making the light enter the one end in the longitudinal direction of the light guide member 2 along an optical axis of the light guide member 2, and one second light source 15A making the light enter obliquely with respect to the one end in the longitudinal direction of the light guide member 2. The other light source unit 3B is provided with the other first light source 14B making the light enter the other end in the longitudinal direction of the light guide member 2 along an optical axis of the light guide member 2, and the other second light source 15B making the light enter obliquely with respect to the other end in the longitudinal direction of the light guide member 2. The control unit 31 turns off the one second light source 15A and turns on the one and the other first light sources 14A, 14B after turning on the one second light source 15A, turns off the one and the other first light sources 14A, 14B and turns on the other second light source 15B after turning on the one and the other first light sources 14A, 14B, and turns off the other second light source 15B after turning on the other second light source 15B.

Namely, the control unit 31 respectively controls the light sources such that the control unit 31 turns off the one second light source 15A provided at one end in the longitudinal direction of the light guide member 2 and turns on the one first light source 14A provided at one end in the longitudinal direction of the light guide member 2 and the other first light source 14B provided at the other end in the longitudinal direction of the light guide member 2 after turning on the one second light source 15A, turns off the one and the other first light sources 14A, 14B and turns on the other second light source 15B after turning on the one and the other first light sources 14A, 14B, and turns off the other second light source 15B provided at the other end in the longitudinal direction of the light guide member 2 after turning on the other second light source 15B. Because the one second LED 15A is distinguished after the one second LED 15A is lighted, and the one first LED 14A and the other first LED 14B are lighted, the whole length in the longitudinal direction of the light guide member 2 is lighted after the one end side in the longitudinal direction of the light guide member 2 is lighted. Because the one first LED 14A and the other first LED 14B are distinguished and the other second LED 15B is lighted after the one first LED 14A and the other first LED 14B are lighted, the other end side in the longitudinal direction of the light guide member 2 is lighted after the whole length in the longitudinal direction of the light guide member 2 is lighted. Because the other second LED 15B is distinguished after the other second LED 15B is lighted, the whole length of the light guide member 2 is distinguished after the other end side in the longitudinal direction of the light guide member 2 is lighted.

In this way, because the light sources 14A, 14B, 15A, 15B are controlled by the control unit 31 such that the one end side of the light guide member 2 is lighted, then the whole length of the light guide member 2 is lighted, then the other end side of the light guide member 2 is lighted, and then the whole length of the light guide member 2 is distinguished, a bright portion in the light guide member 2 can be moved. Therefore, it appears as though the light is moved from the one end to the other end in the longitudinal direction of the light guide member 2.

Further, in this way, because the one end side of the light guide member 2 is lighted more brightly, the whole length of the light guide member 2 is lighted more brightly, and the other end side of the light guide member 2 is lighted more brightly, the light moving from the one end to the other end in the longitudinal direction of the light guide member 2 can be seen more clearly.

Further, because the light emitted from the one first LED 14A or the one second LED 15A enters the one end in the longitudinal direction of the light guide member 2 and is guided and diffused, the light gradation is formed such that the light quantity is gradually reduced and the light guide member 2 is gradually darker toward the other end in the longitudinal direction of the light guide member 2. Further, because the light emitted from the other first LED 14B or the other second LED 15B enters the other end in the longitudinal direction of the light guide member 2 and is guided and diffused, the light gradation is formed such that the light quantity is gradually reduced and the light guide member 2 is gradually darker toward the one end in the longitudinal direction of the light guide member 2. Therefore, it appears as though the light flows smoothly.

In this way, it appears as though the light flows smoothly with the small number of light sources (the one first LED 14A, the one second LED 15A, the other first LED 14B, and the other second LED 15B). Thereby, the circuit and the wiring for lighting the light source units are simplified and at low cost. Therefore, even using an LED in the light source unit, the cost can be reduced, and the cost of the on-vehicle interior lighting device 1 can be reduced.

Further, in the illuminating device 1 according to the first embodiment of the present invention, the light emitted from the one second LED 15A enters obliquely with respect to the one end in the longitudinal direction of the light guide member 2, and the light emitted from the other second LED 15B enters obliquely with respect to the other end in the longitudinal direction of the light guide member 2. Therefore, the light entering obliquely with respect to the one end in the longitudinal direction of the light guide member 2 makes the one end side brighter, and the other end side darker so that the light gradation is emphasized. Further, the light entering obliquely with respect to the other end in the longitudinal direction of the light guide member 2 makes the other end side brighter, and the one end side darker so that the light gradation is emphasized. Therefore, the light flowing smoothly can be seen more clearly.

Second Embodiment

Next, the illuminating device 1 according to a second embodiment of the present invention will be explained with reference to FIG. 5. Incidentally, the same components as the first embodiment are denoted by the same reference signs, and the explanation thereof will be omitted.

In this embodiment, a difference from the illuminating device 1 according to the first embodiment is that only the one first LED 14A arranged consistent with the designed optical axis L2 (see FIG. 1B) of the light guide portion 9 of the light guide member 2 is provided on the one light source unit 3A, and only the other first LED 14B arranged consistent with the designed optical axis L2 (see FIG. 1B) of the light guide portion 9 of the light guide member 2 is provided on the other light source unit 3B.

Further, an optical property of the light guide member 2 is such that the light gradation is easily formed so that the light emitted from the one first LED 14A makes the one end side in the longitudinal direction of the light guide portion 9 brighter and the other end side in the longitudinal direction of the light guide member 2 darker. Further, the optical property of the light guide member 2 is such that the light gradation is easily formed so that the light emitted from the other first LED 14B makes the other end side in the longitudinal direction of the light guide portion 9 brighter and the one end side in the longitudinal direction of the light guide member 2 darker.

Incidentally, in the present invention, the optical property for easily forming the light gradation means that the light guide member 2 is formed such that as the light guide member 2 extends away from the one first LED 14A, the light guide member 2 is gradually darker, and as the light guide member 2 extends away from the other first LED 14B, the light guide member 2 is gradually darker, for example, because the light guide member 2 is formed oblong, or the shapes and the sizes of the reflecting dots are the same.

Figure 5A:
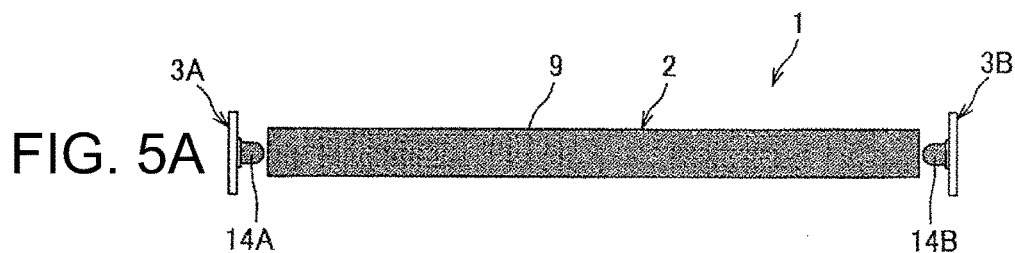
FIG. 5A is an explanatory view for explaining a configuration and an illumination effect of the illuminating device according to a second embodiment showing a whole length of a light guide member is distinguished in an initial condition.

As shown in FIG. 5A, in an initial condition of the illuminating device 1 according to the second embodiment of the present invention, the one first LED 14A of the one light source unit 3A is distinguished, the other first LED 14B of the other light source unit 3B is distinguished, and the whole length of the light guide member 2 is distinguished.

Figure 5B:
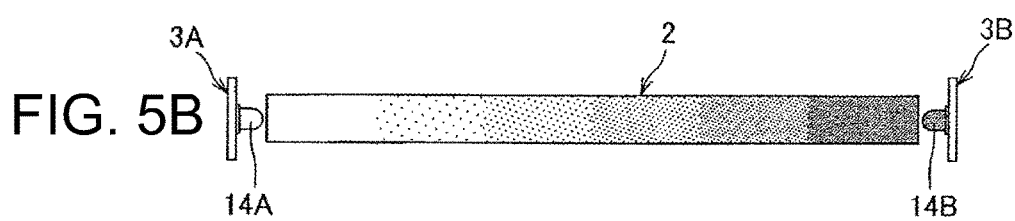
FIG. 5B is an explanatory view showing the one end side of the light guide member is lighted.

Next, as shown in FIG. 5B, the one second LED 15A of the one light source unit 3A is lighted, and the one end side in the longitudinal direction of the light guide member 2 is lighted.

At this time, the light gradation is formed such that the one end side in the longitudinal direction of the light guide member 2 becomes bright, and the other end side in the longitudinal direction of the light guide member 2 becomes dark. Incidentally, in figures, because the light gradation is schematically shown by small dot patterns, the gradation is shown in six grades. However, in reality, the gradation is smoothly changed.

Figure 5C:
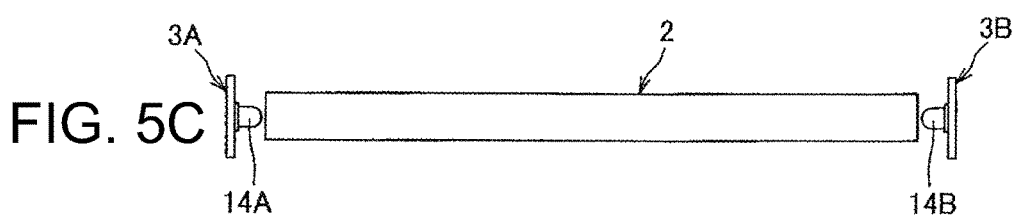
FIG. 5C is an explanatory view showing the whole length of the light guide member is lighted.

Next, as shown in FIG. 5C, the other first LED 14B of the other light source unit 3B is lighted. Thereby, the whole length of the light guide member 2 is lighted.

Figure 5D:
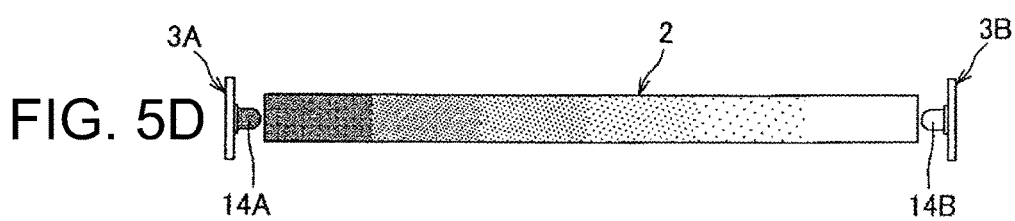
FIG. 5D is an explanatory view showing the other end side of the light guide member is lighted.

Next, as shown in FIG. 5D, the one first LED 14A of the one light source unit 3A is distinguished. Thereby, the other end side in the longitudinal direction of the light guide member 2 is lighted.

At this time, the light gradation is formed such that the other end side in the longitudinal direction of the light guide member 2 becomes bright, and the one end side in the longitudinal direction of the light guide member 2 becomes dark. Incidentally, in figures, because the light gradation is schematically shown by small dot patterns, the gradation is shown in six grades. However, in reality, the gradation is smoothly changed.

Figure 5E:
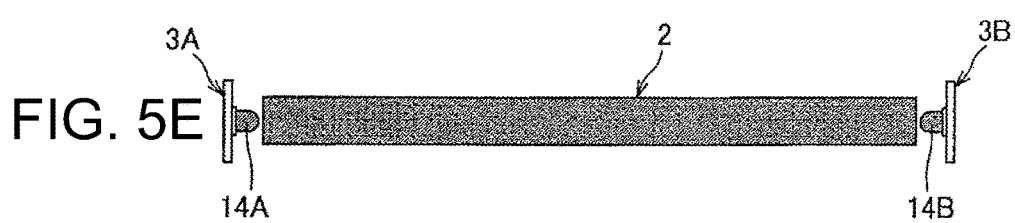
FIG. 5E is an explanatory view showing the whole length of the light guide member is distinguished.
Figure 6:
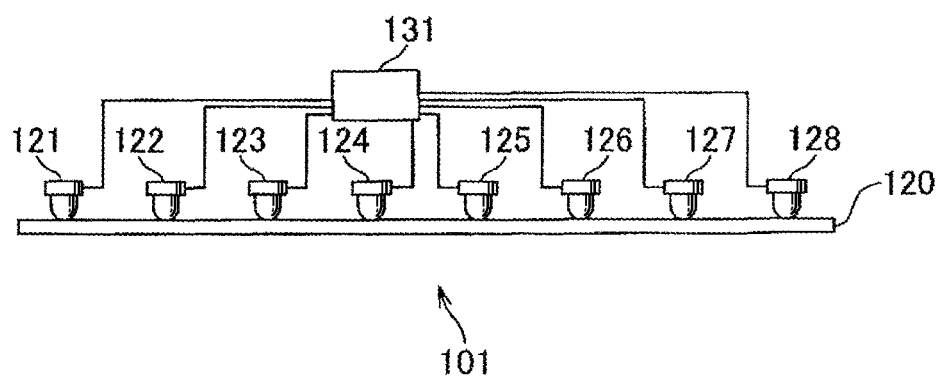
FIG. 6 is an explanatory view showing a configuration of a conventional on-vehicle interior illuminating device.
Figure 7:
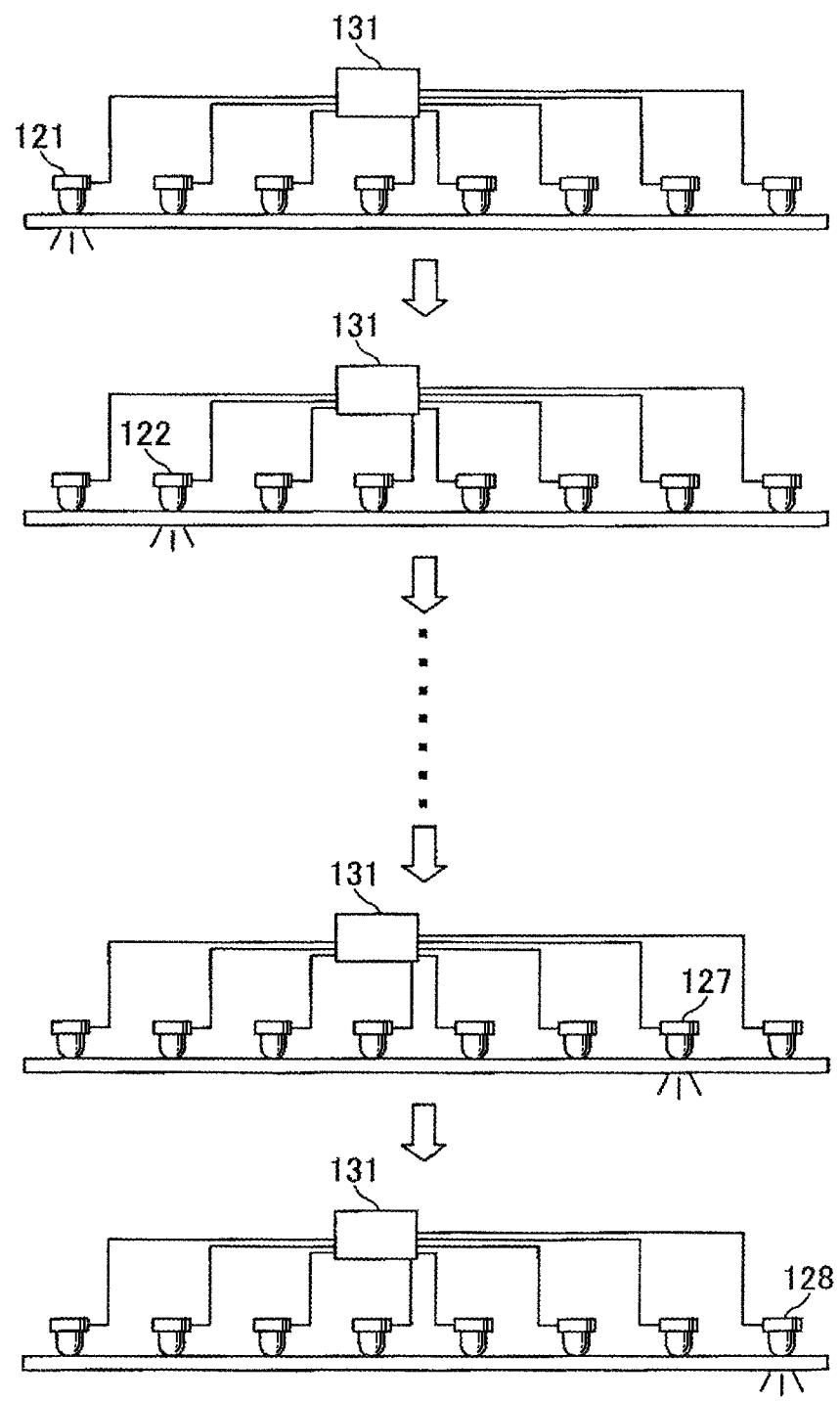
FIG. 7 is an explanatory view showing an illumination effect of the on-vehicle interior illuminating device shown in FIG. 6.

Next, as shown in FIG. 5E, the other first LED 14B of the other light source unit 3B is distinguished, and the whole length of the light guide member 2 is distinguished.

In this way, such a procedure is sequentially performed, and the illumination effect such that the light flows from the one end to the other end in the longitudinal direction of the light guide member 2 is attained.

Incidentally, by providing a well-known light modulation device such as a phase control light modulation system for adjusting power supply, a PWM (Pulse Width Modulation) system for repeating the lighting and the extinction based on a signal, or the like, the amount of the light emitted from the one first LED 14A, the one second LED 15A, the other first LED 14B, or the other second LED 15B can be controlled. Thereby, the light gradation can be further emphasized, and the light flowing smoothly can be seen more clearly.

As explained the above, the illuminating device 1 according to the second embodiment of the present invention includes: the light guide member 2, the light entering from both ends of which in a longitudinal direction thereof being guided and diffused; the one first LED 14A provided at one end in the longitudinal direction of the light guide member 2; the other first LED 14B provided at the other end in the longitudinal direction of the light guide member 2; and the control unit 31 respectively controls lighting of both one first LED 14A and the other first LED 14B. The control unit 31 turns on the other first LED 14B after turning on the 14A, turns off the one first LED 14A after turning on the other first LED 14B, and turning off the other first LED 14B after turning off the one first LED 14A.

Namely, because the light emitted from the one first LED 14A enters the one end in the longitudinal direction of the light guide member 2 and is guided and diffused, the light gradation is formed such that the light quantity is gradually reduced and the light guide member 2 is gradually darker toward the other end in the longitudinal direction of the light guide member 2. Further, because the light emitted from the other first LED 14B enters the other end in the longitudinal direction of the light guide member 2 and is guided and diffused, the light gradation is formed such that the light quantity is gradually reduced and the light guide member 2 is gradually darker toward the one end in the longitudinal direction of the light guide member 2. Therefore, the light flowing smoothly can be seen more clearly.

It appears as though the light flows smoothly with the smaller number of light sources (the one first LED 14A, the other first LED 14B). Thereby, the circuit and the wiring for lighting the light source units are further simplified and at low cost. Therefore, even using an LED in the light source unit, the cost can be reduced, and the cost of the on-vehicle interior lighting device 1 can be further reduced.

Incidentally, in the embodiments described above, by the control of the control unit 31, the illumination effect such that the light flows from the one end to the other end in the longitudinal direction of the light guide member 2 is attained. However, it is also possible by the control of the control unit 31, the illumination effect such that the light flows from the other end to the one end in the longitudinal direction of the light guide member 2 is attained.

Further, in the embodiments described above, the LED is used as the light source. However, other well-known light source such as incandescent lamp, halogen lamp, or cold cathode tube can also be used.

INDUSTRIAL APPLICABILITY

The on-vehicle interior illuminating device according to the present invention can be used as an illuminating device for illuminating an interior of a vehicle or the like.

REFERENCE SIGNS LIST 1 illuminating device
2 light guide member
3A one light source unit
3B the other light source unit
14A one first LED (one first light source)
15A one second LED (one second light source)
14B the other first LED (the other first light source)
15B the other second LED (the other second light source)
31 control unit
L2 light axis

The invention claimed is:
1. An on-vehicle interior illuminating device comprising:
a light guide member having one end and the other end arranged in a longitudinal direction thereof and configured to guide and diffuse light from both the one end and the other end;
one light source unit provided at the one end of the light guide member;
the other light source unit provided at the other end of the light guide member; and
a control unit configured to respectively control lighting of both one and the other light source units,
wherein the control unit sequentially controls the one light source and the other light source to cause a light gradation within the light guide member to travel across the length of light guide member from the one end to the other end by turning on the other light source unit after turning on the one light source unit, turning off the one light source unit after turning on the other light source unit, and turns off the other light source unit after turning off the one light source unit such that each portion of the light guide member changes smoothly from dark to bright to dark as the light gradation travels across the length of the light guide member,
wherein the light emitted from the one light source unit enters obliquely with respect to the one end of the light guide member,
wherein the light emitted from the other light source unit enters obliquely with respect to the other end of the light guide member, wherein a side of the one end is a first entrance plane through which the light from the one light source units enters into the light guide member, wherein a side of the other end is a second entrance plane through which the light from the other light source units enters into the light guide member, and wherein the light entered from the first entrance plane into the light guide member and the light entered from the second entrance plane into the light guide member are guided and diffused in the light guide member.

2. The on-vehicle interior illuminating device as claimed in claim 1, wherein the one light source unit is provided with one first light source making the light enter the one end of the light guide member along an optical axis of the light guide member, and one second light source making the light enter obliquely with respect to the one end of the light guide member, wherein the other light source unit is provided with the other first light source making the light enter the other end of the light guide member along an optical axis of the light guide member, and the other second light source making the light enter obliquely with respect to the other end of the light guide member, and wherein the control unit turns off the one second light source and turns on the one and the other first light sources after turning on the one second light source, turns off the one and the other first light sources and turns on the other second light source after turning on the one and the other first light sources, and turns off the other second light source after turning on the other second light source.

3. The on-vehicle interior illuminating device as claimed in claim 1, wherein the light guide member spaces apart in the longitudinal direction the one light source unit from the other light source unit.

4. The on-vehicle interior illuminating device as claimed in claim 1, wherein the light guide member has an optical axis, and wherein the one light source unit and the other light source unit each include an optical axis that is fixed relative to the optical axis of the light guide member.

5. The on-vehicle interior illuminating device as claimed in claim 1, wherein the light guide member has an optical axis, and the light guide member includes a reflector located to one side of the optical axis; and wherein the one light source unit and the other light source unit each include a light source located to another side of the optical axis that is opposite to the one side of the optical axis.

6. The on-vehicle interior illuminating device as claimed in claim 1, wherein the one light source unit and the other light source unit are located externally of the light guide member.

7. The on-vehicle interior illuminating device as claimed in claim 1, wherein a shape of the light guide member is a cylinder shape or a square pole shape.

8. The on-vehicle interior illuminating device as claimed in claim 1, wherein the one light source unit includes only one first light source and one second light source as light sources, and wherein the other light source unit includes only the other first light source and the other second light source as light sources.

9. The on-vehicle interior illuminating device as claimed in claim 1, wherein the one light source unit includes only one first light source as a light source, and wherein the other light source unit includes only the other first light source as a light source, and wherein the one first light source is arranged so that an optical axis of the one first light source is consistent with a designed optical axis of the light guide portion of the light guide member, and wherein the other first light source is arranged so that an optical axis of the other first light source is consistent with a designed optical axis of the light guide portion of the light guide member.

10. The on-vehicle interior illuminating device as claimed in claim 8, wherein the one first light source is arranged so that an optical axis of the one first light source is consistent with a designed optical axis of the light guide portion of the light guide member, and wherein the other first light source is arranged so that an optical axis of the other first light source is consistent with a designed optical axis of the light guide portion of the light guide member.

11. The on-vehicle interior illuminating device as claimed in claim 8, wherein the one second light source is arranged so that an optical axis of the one second light source is inclined with respect to the designed optical axis of the light guide portion of the light guide member, and wherein the other second light source is arranged so that an optical axis of the other second light source is inclined with respect to the designed optical axis of the light guide portion of the light guide member.

12. The on-vehicle interior illuminating device as claimed in claim 9, wherein the one second light source is arranged so that an optical axis of the one second light source is inclined with respect to the designed optical axis of the light guide portion of the light guide member, and wherein the other second light source is arranged so that an optical axis of the other second light source is inclined with respect to the designed optical axis of the light guide portion of the light guide member.

* * * * *